United States Patent

[11] 3,594,517

[72] Inventors Charles L. Woodruff
1109 East 15th Street South;
Ruben L. Wienke, 1290 First Avenue West,
both of Newton, Iowa 50208

[21] Appl. No. 823,816
[22] Filed May 12, 1969
[45] Patented July 20, 1971

[54] VERIFIER FOR WIRING OF NUMBER IDENTIFIERS
13 Claims, 6 Drawing Figs.

[52] U.S. Cl. .......... 179/175.25, 179/18 FH
[51] Int. Cl. .......... H04m 3/22, H04q 3/72
[50] Field of Search .......... 179/175.25, 175.2, 18 FH

[56] References Cited
UNITED STATES PATENTS 2,863,958 12/1958 Clement .......... 179/175.2
2,866,008 12/1958 Walsh .......... 179/27 DB

*Primary Examiner*—William C. Cooper
*Attorney*—Zarley, McKee & Thomte

ABSTRACT: A device for verifying the core panel wiring of identifier equipment for direct-dial long distance telephone equipment comprising plurality of lamps connected through two groups of relays to the output of the core panel of the identifier equipment, wherein the first of said two groups of relays are operatively connected to one of the sequencing relays of the identifier equipment which selectively provide input voltage to the core panel, and the second group of relays being connected to a source of energy independent of the sequencing relays to hold in an illuminated condition any lamps lighted in response to output from the first sequential output from the core panel. An additional lamp operatively connected to the identifier equipment to indicate that the equipment is in use, a party selection switch connected to the party identification relays of the identifier equipment, and a starting switch to connect the verifying device to the circuitry of the identifier equipment.

INVENTORS
CHARLES L. WOODRUFF
RUBEN L. WIENKE
BY Zarley, McKee & Thomte
ATTORNEYS

INVENTORS
CHARLES L. WOODRUFF
BY RUBEN L. WIENKE

Zarley, McKee & Thomte
ATTORNEYS

INVENTORS
CHARLES L. WOODRUFF
RUBEN L. WIENKE
BY

ATTORNEYS

VERIFIER FOR WIRING OF NUMBER IDENTIFIERS

Direct-dial telephones require that automatic equipment gather sufficient information from the calling telephone that a record of the call can be made for billing purposes. This information is collected automatically by a toll center which may service several cities or communities. The toll center is in communication with the trunkline being used, and call identifier equipment in the local telephone office from whence the call originates is also in connection with the trunkline for a short period of time to feed identifying information to the toll center. The toll center senses the dialing of the long distance call through the trunkline, and after the last digit of the number has been dialed, the toll center sends a signal back on the trunkline which connects the identifier equipment in the local office to the trunkline, whereupon the identifier equipment identifies the number of the local telephone being used, and transmits this information to the toll center in a matter of 2 to 6 seconds.

The heart of the identifier equipment in the local telephone office is the core panel which contains wiring used to separately identify as many as 800 telephones. Each telephone is separately wired in a predetermined sequence on the core panel so that its number can be identified when a direct-dial long distance call is made therefrom. However, if the number of a given local telephone is incorrectly wired on the core panel, the identifier equipment will never be able to accurately identify the number, and incorrect billing information will be sent by the identifier equipment to the toll center whenever that particular telephone is used to make a direct-dial long distance call.

THerefore, the principal object of this invention is to provide an automatic method and means to verify the accuracy of the wiring of the core panel of identifier equipment for direct-dial long distance telephone systems.

A further object of this invention is to provide a method and means of actuating and reading identifier equipment in a local telephone office for purposes of comparing the identifying information produced thereby with the known identifying number of the telephone line being checked to verify the accuracy of the output information of the identifier equipment.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

The identifier equipment and its connection to the toll center are conventional components, and will be described only to the extent that it is necessary in order to describe the function and use of the verifier which is the heart of this invention.

Figure 1:
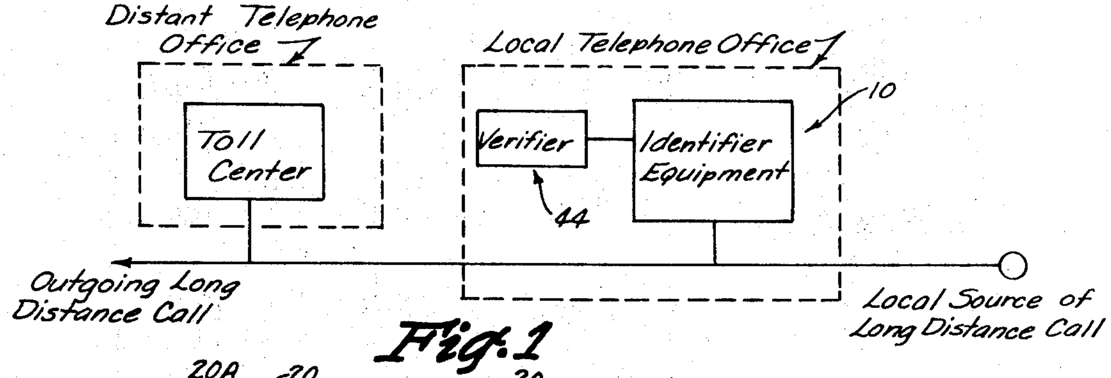
FIG. 1 is a schematic drawing showing the physical relationship of the verifier device of this invention to the identifier equipment of the local office and the toll center in a distant city.
Figures 3, 4:
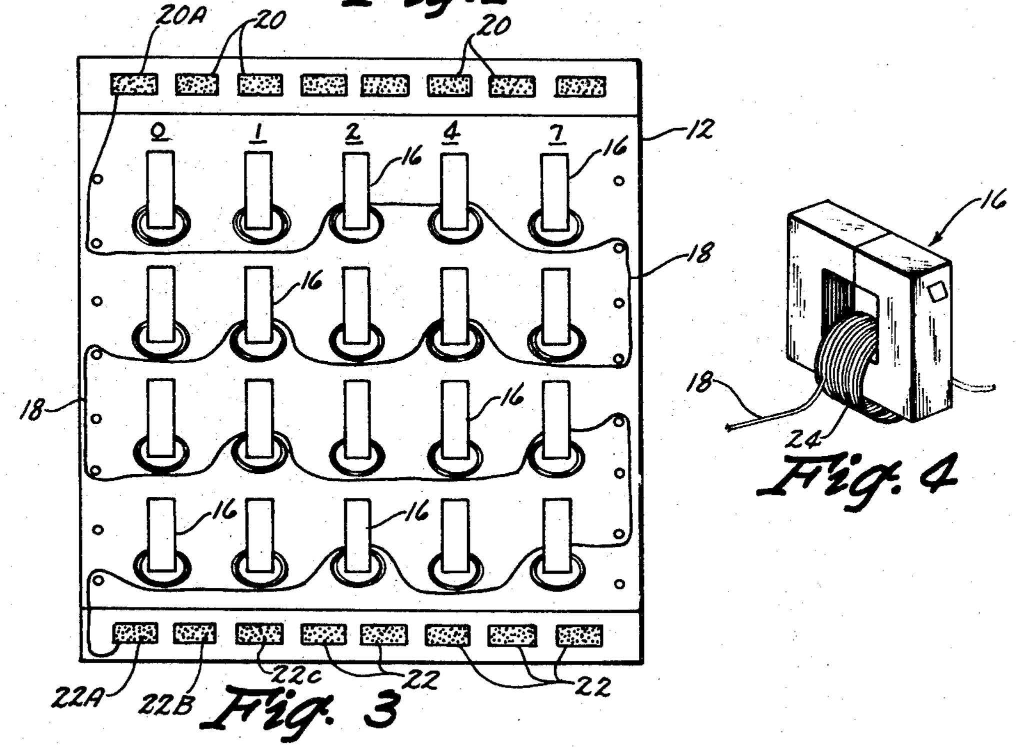
FIG. 3 is a front elevational view of a core panel used in the identifier with only a single telephone line wired thereon.
FIG. 4 is a perspective view of an individual core mounted on the core panel.

The conventional identifier 10 includes a core panel 12 which is comprised of a panel 14 with a plurality of rows of tens iron cores 16 mounted thereon in any convenient fashion. The number of cores will depend on the number of telephone lines involved, but in a small town where all telephones will have the same three-digit prefix, identification of the last four digits of the telephone number is all that is required. As will be discussed hereafter, the top horizontal row of cores in the panel shown in FIG. 3 is used to identify the thousands digit in a four-digit number; the next lower row is used to identify the hundreds digit; the next row is used to identify the tens digit; and the bottom horizontal row is used to identify the units digit. It should also be noted that the first vertical row of cores 16 shown at the left-hand side of FIG. 3 is used to identify the number 0; the next adjacent vertical row of cores is used to identify the number 1; the next row identifies the number 2; the next row identifies the number 4; the next adjacent vertical row identifies the number 7. As will be discussed hereafter, the number 1, 2, 3, 4, 5, 6, 7, 8, 9 and 0 can be identified by extending a line through two cores whose collective sum equals the number to be identified. For example, the four-digit number identified on the panel 12 in FIG. 3 is 6589. The wire 18 is threaded through the 2 and 4 cores 16 in the top thousands row to identify the digit 6; the wire 18 is threaded through the 1 and 4 cores 16 in the second hundreds row to identify the digit 5, and so on.

A plurality of terminal plates 20 (usually eight in number) with approximately 100 terminal pins are horizontally mounted at the top of panel 12, and similar plates 22 are mounted at the bottom of the same panel. The wire 18 is used to identify one telephone line, and its opposite ends are connected to corresponding terminal pins on corresponding plates 20 and 22 as shown in FIG. 3. Each of the cores 16 has an electrical coil 24 wound thereon as shown in FIG. 4. These cores 16 and coils 24 will be discussed further hereafter as they relate to the total circuitry of the identifier 10.

Figure 5:
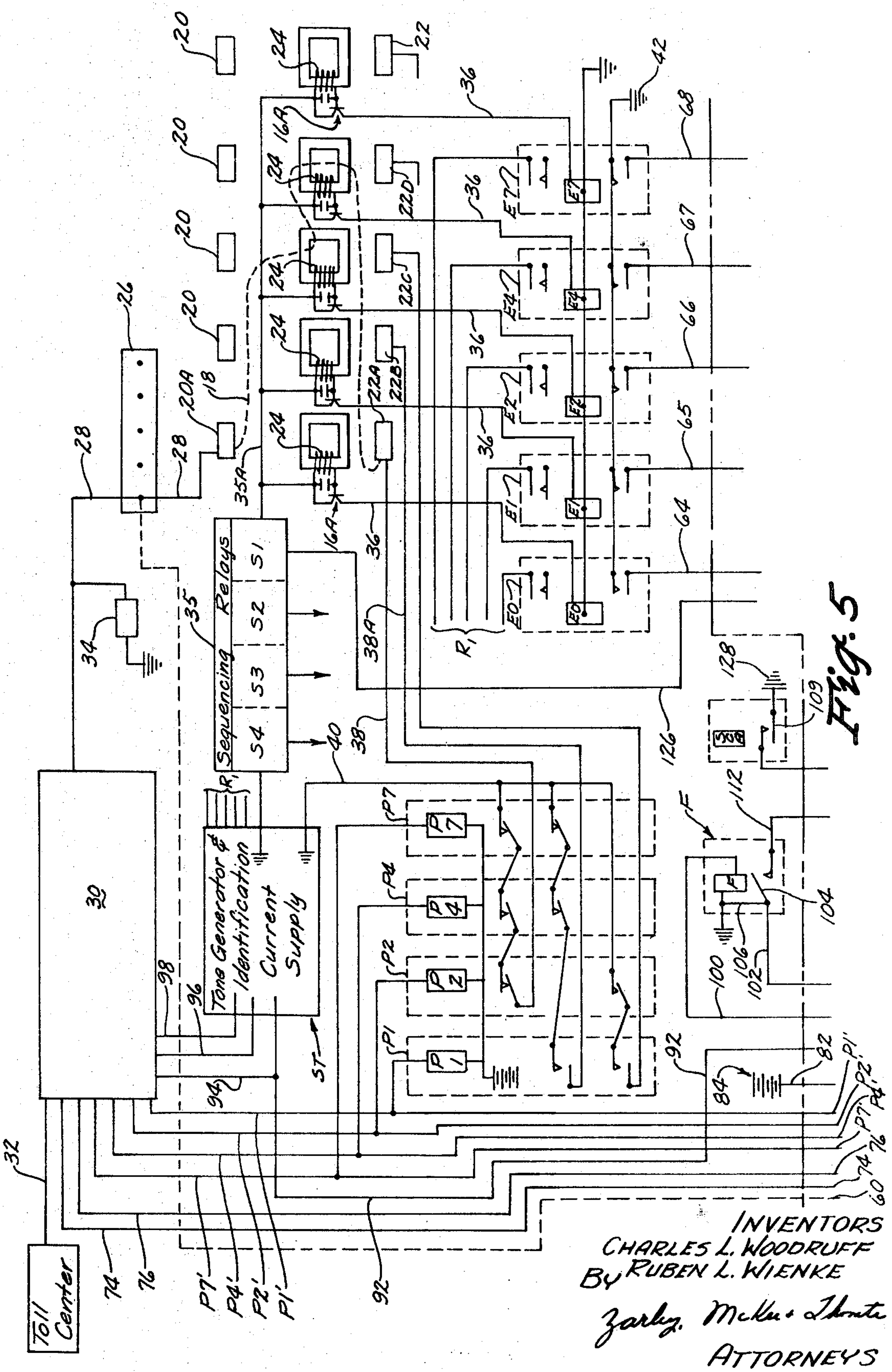
FIG. 5 is a schematic wiring diagram showing typical components of the identifier and their relationship to the trunkline and the toll center.

With reference to FIG. 5, the numeral 26 designates a connector sleeve in the local telephone office to which a given local telephone line 28 is connected. The line or sleeve wire 28 is connected to a conventional control panel 30 which will not be described in detail here, but which includes control relays which serve to introduce the identifier equipment to the toll center circuitry at predetermined times. The control panel 30, which is located in the local telephone office, is connected to the trunkline 32 to which a toll center (perhaps in a distant city) has operative access. The numeral 34 designates a conventional line cutoff relay.

When a caller "direct dials" a long distance number, the toll center automatically senses the call through conventional equipment, but identification of the calling line is not made. However, after the last digit of the number is dialed, but before the toll center completes the call, the toll center emits a signal by way of trunkline 32 that operates a relay (not shown) in control panel 30. This relay is opened for a period of approximately 2 to 6 seconds to give the identifier 10 an opportunity to identify the number making the call. The conventional identifier equipment (prior to modification by this invention) utilizes normally open relay F (FIG. 5) as a master switch. Relay F is normally held open by a battery (not shown) but when the toll center opens the control relay in control panel 30, the battery is ineffective to hold the relay F open, and the relay F closes to provide ground for all the identifier equipment, and the identifier commences to function. Again this function of the conventional identifier is repeated here only as it bears on the verifier device which will be discussed hereafter.

When the conventional identifier equipment is actuated as discussed above, the identification current supply ST is energized and input voltage is supplied to the coils 24 of cores 16 through sequencing relays 35 and lead 35A so that all the coils 24 are energized. However, the transistors 16A prevent voltage from passing beyond the cores except for those cores through which line 18 is threaded. Line 18 is connected to telephone line 28 through terminal plate 20A, and the e.m.f. through line 18 triggers the transistors 16A of the cores through which line 18 is threaded, thus supplying energy to a combination of two of the relays E0, E1, E2, E4 and E7 which are connected to cores 16 by leads 36. The sequencing relays 35 would provide voltage sequentially to the thousands, hundreds, tens and units cores 16 described heretofore. For purposes of convenience, only the thousands cores 16 are shown in FIG. 5.

The normally open contacts at relays E0, E1, E2, E4 and E7 are each connected to the tone generator ST by a plurality of individual leads generally indicated as R1 in FIG. 5, and as various of these relays are actuated and closed, this intelligence is fed back to the toll center through the tone generator, control panel 30 and trunkline 32. Thus, as the first sequencing relay 35 (S1) permits the thousands cores to be read, relays E2 and E4 will be energized and closed in the manner previously described because the telephone line in question (line 18) has been threaded through the cores 16 which are "upstream" from these respective relays. The toll center will thereupon read the numeral 6 as the thousands digit according to the method described above, and will then read the hundreds digit as the next sequencing relay 35 (S2) functions to permit the next row of cores 16 to be read. If the core panel was threaded by wire 18 as shown in FIG. 3 with wire 18 threaded through the No. 1 and No. 4 column of cores in the second horizontal row of cores (the hundreds row), relays E1 and E4 would close and the toll center would read the numeral 5 for the hundreds digit. This process would be repeated for the tens and units digits.

When party lines are involved, it is necessary to segregate this information before going through the core panel 12. The control panel 30 automatically knows through conventional equipment that the caller is on a party line, and this is accomplished by either the presence or absence of a conventional high-resistance ground on the caller's phone, or because the caller is required to dial his party identification number on the phone. Thus, when a direct distance call is made from a party line, the F relay is actuated as discussed above, and a relay (not shown) in control panel 30 senses the party line call and operates to bring battery G into operation and to connect relays P1, P2, P4 and P7 to ground. Let it be assumed that the call was from a line on party cluster terminal plate 22A (FIGS. 3 and 5). Control panel 30 withholds voltage from relay P1 whereupon relays P2, P4 and P7 are closed to the positions shown in FIG. 5. Thus, the circuitry through party cluster plate 22A is completed from plate 22A through line 38, thence through the upper tier of closed points on relays P2, P4 and P7 (FIG. 5) and thence through line 40 to the identification current supply ST. This permits the current to pass through the sequencing relays 35 in the manner described heretofore so that the cores 16 through which the line 18 is threaded can be monitored. If terminal plate 22B is designated for all lines on a second party line, relays P1, P4 and P7 will be operated (as voltage is withheld from relay P2), and plate 22B will be connected to the current supply ST through line 38A, the closed points in the second tier of points in relays P1, P4 and P7, and thence through line 40. The panel board 12 can accommodate a plurality of party line cluster plates 22 indicated in FIG. 3, but only five have been shown in FIG. 5.

The foregoing description relates to existing identifier equipment and does not of itself comprise the instant invention. It can be understood at this point that if the wire 18 in FIG. 3 which is threaded through the cores 16 to identify the number 6589 was actually connected to a line correctly identified as 6489, all direct dial calls from 6489 would be recorded in the toll center as coming from 6589 and incorrect billing would result. The device of this invention makes slight modifications in the conventional identifier circuitry and provides apparatus for checking a given number such as 6589 to make sure that it is properly wired on the core panel 12.

Figure 2:
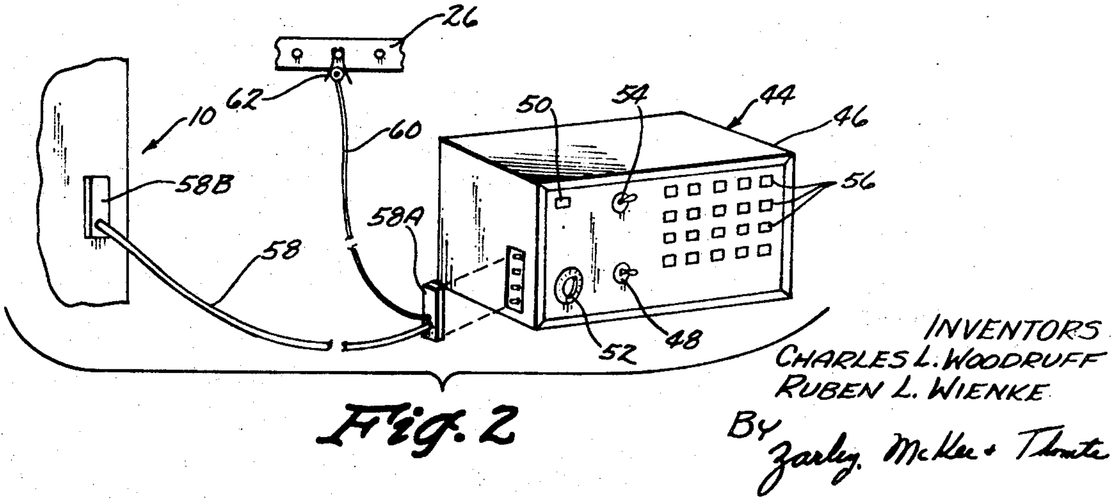
FIG. 2 is a schematic view showing how the verifier of this invention is connected to the identifier equipment and the telephone line being checked in the local telephone office.

The conventional identifier equipment is slightly modified by placing an additional set of contacts on each of the relays E0, E1, E2, E4 and E7, and these are the lower group of contacts shown in FIG. 5 which are connected to a common ground 42. In addition, a starting switch, to be described hereafter, is connected "upstream" from relay F to bring the verifier 44 into play. The verifier 44 is housed in a container 46 and includes starting switch 48, "busy" lamp 50, party dial switch 52, lamp switch 54, and a plurality of lamps 56 which each correspond in location and significance to each of the cores 16 on panel 12. A harness 58 (FIG. 2) contains a plurality of leads and has terminal plugs 58A and 58B which can be connected to complementary plugs on the verifier 44 and identifier 10. Line 60 with alligator clip 62 thereon extends from plug 58A. Clip 62 is used to make a connection on the individual line being tested, and is secured to the individual line sleeve on the main frame at connector sleeve 26 (FIG. 5). The opposite end of line 60 extends to a terminal on starter switch 48.

Figure 6:
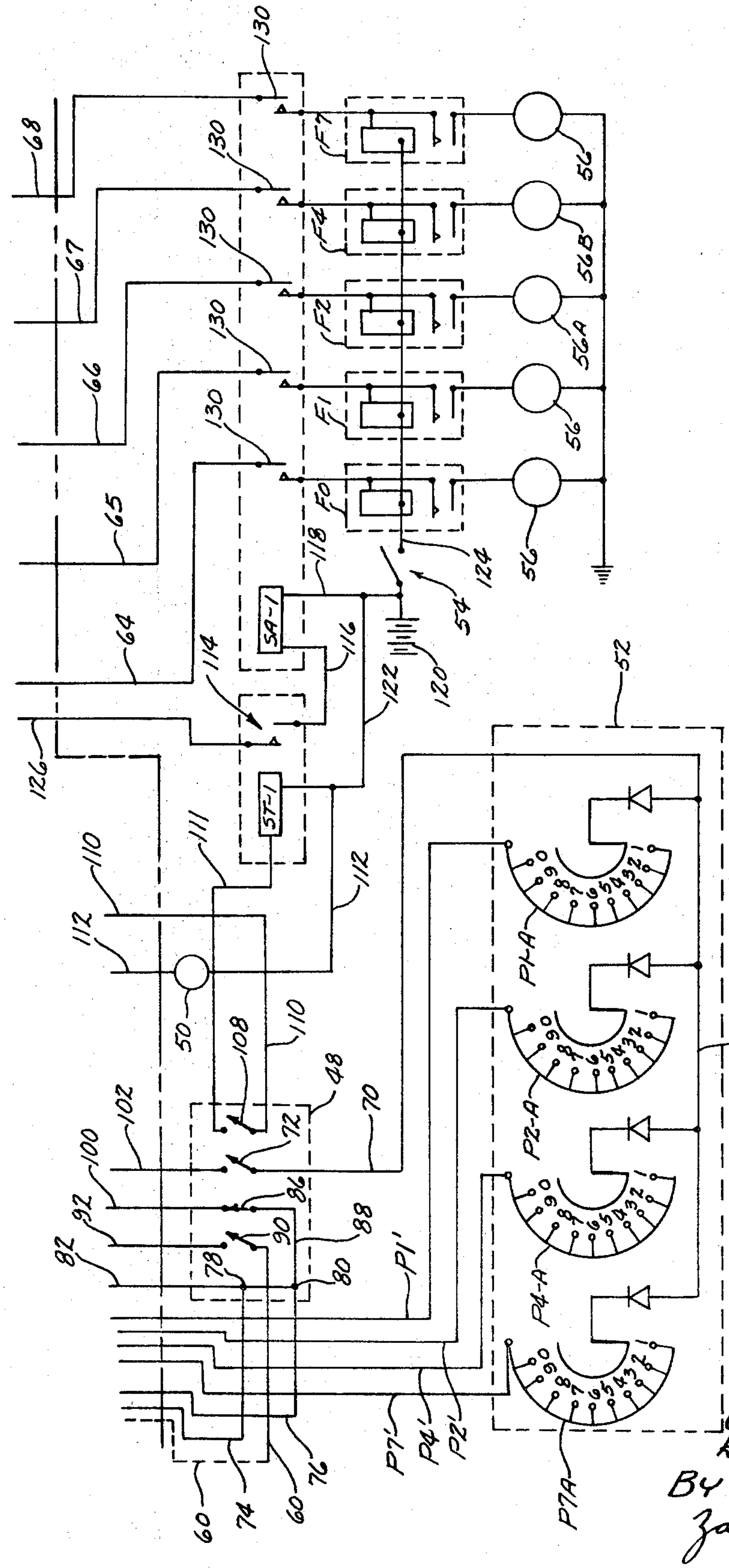
FIG. 6 is a schematic wiring diagram of the verifier device. The top of FIG. 6 is drawn to merge with the bottom of FIG. 5, and the combined Figures show the interconnection between the identifier and the verifier.

With reference to FIGS. 5 and 6, lines 64, 65, 66, 67 and 68 interconnects relays E0, E1, E2, E4 and E7 with the respective relays F0, F1, F2, F4 and F7 in the verifier 44. These relays in the verifier correspond to the thousands digit of the telephone number, just as do the E series relays in the identifier 10 (FIG. 5) and the cores 16 in FIG. 5. The lines 64—68 are contained in harness 58. The actual verifier and identifier also have a series of corresponding relays which relate to the hundreds, tens and units digits, but these have not been shown in FIGS. 5 and 6 for purposes of simplicity. The description of the function of the E series relays in identifier 10 and the F series relays in verifier 44 will be typical of the remaining relays which are not shown. Lamps 56 (FIG. 6) are connected to the normally open contacts of relays F0, F1, F2, F4 and F7, and these lamps are the upper row of lamps 56 on the front panel of the verifier in FIG. 2.

Lines P1′, P2′, P4′ and P7′ connect control panel 30 to relays P1, P2, P4 and P7 (FIG. 5), respectively, and these lines are extended through harness 58 and are connected to party switch 52 as shown in FIG. 6, with each line being connected to a rotary switch portion P1–A, P2–A, P4–A, and P7–A, respectively. Each of the switch portions are connected to a common line 70 which is connected to the terminal of switch element 72 in starting switch 48.

Power control leads 74 and 76 extend from control panel 30 through harness 58 to terminals 78 and 80 respectively, on starter switch 48. Line 82 connects terminals 78 and 80 to battery 84 in identifier 10. Terminal 80 is connected to switch the terminal of switch element 86 by line 88. Line 60 (which is clipped to the telephone line being checked as described above) is connected to the terminal of switch element 90 in starting switch 48.

Switch element 90 is connected by line 92 to the tone generator and identification current supply ST through sleeve wire 94 which connects the member ST with control panel 30. (Wires 96 and 98, respectively, are the "ring" and "tip" wires that extend from member ST to control panel 30 in conventional fashion.)

Wire 100 connects switch element 86 with one side of master relay F, and wire 102 connects switch element 72 with one side of the switch element 104 in relay F. Wire 106 connects switch element 104 to the grounded side of the coil of relay F. Switch element 108 on starting switch 48 is connected to switch element 109 in relay SCA by wire 110. The other side of switch element 108 is connected to the coil of relay ST–1 by line 111. The other side of the coil of relay St–1 is connected to switch element 104 of relay F by means of wire 112, and busy lamp 50 is imposed in this line. One side of the switch element 114 in relay ST–1 is connected to the coil in relay SA–1 by wire 116, and the other side of the coil is connected to battery 120 by lead 118. Wire 122 interconnects leads 112 and 118 as seen in FIG. 6. Lamp switch 54 connects battery 120 to a ground wire 124 which is common to the coils of relays F0, F1, F2, F4 and F7. The side of switch element 114 in relay ST–1 which is opposite to wire 116 is connected to the first of the sequencing relays S1 in 35 by wire 126.

When it is desired to verify the wiring on the core panel 12 of a given number, the harness 58 is connected to the identifier 10 and verifier 44, and line 60 is connected to the line sleeve to be checked by means of the clip 62. If the identifier is not then in use, the switches and relays in FIGS. 5 and 6 will be as illustrated. The relay F is normally held open, but if the identifier is in use, the relay F will be closed, whereupon the busy lamp 50 will be illuminated for it is connected to battery 120 through lead 122 which is connected to the line 112 in which the lamp is imposed. If lamp 50 is illuminated, the test is delayed a few seconds until the identifier is free and relay F has opened. The verifier test is normally made upon installation of a new telephone, so that operator knows which party line is involved. If the line being tested is on party line No. 1, the party switch 52 is dialed to position No. 1. This brings the switch portions P1–A, P2–A, P4–A and P7–A, which are superimposed on each other in the physical switch 52, to a proper position of alignment wherein current is withheld from relay P1 (in identifier 10, FIG. 5), but voltage can be applied to relays P2, P4, and P7. Thus, when voltage is applied during the test, the party line No. 1 will be segregated exactly in the manner described above when the party identification intelligence was fed to the relays P1, P2, P4 and P7 by the control panel 30.

The lamp switch 54 is then closed, but the test is not yet operative at this point, and none of the lamps 56 are yet illuminated.

The starting switch 48 normally holds the switch elements 90, 86, 72 and 108 in the positions shown in FIG. 6. When the starting switch is turned to the "on" position, the positions of the switch elements 90, 86, 72 and 108 change so that switch elements 90, 72 and 108 close on lines 92, 102 and 111, respectively, and switch element 86 opens from line 100. Since relay F is normally held in an open position, the opening of switch element 86 breaks the circuit to F and permits it to close switch element 104. Busy lamp 50 is then illuminated and will remain on while the test is being run.

The closing of starter switch 48 closes switch element 108 and this permits the SCA relay to close and to provide voltage from ground 128 to energize the coil of relay ST–1. This closes switch element 114 of relay ST–1 and the coil of relay SA–1 is then connected to sequencing relay S1 (FIG. 5) by line 126, closed switch element 114, and line 116. This causes all of the contacts 130 in relay SA–1 to close. Simultaneously with the foregoing happenings, current is placed on line 60 from line 92 through the closed switch element 90 in starter switch 48, just as if a direct-dial call were being made on the line being tested. This e.m.f. is transmitted to line 18 on the core panel through the connection of line 60 on member 26, and the conventional connection of line 28 on terminal plate 20A to which line 18 is connected.

The power input through the party identification relays is effected through the selection of the proper setting of the party switch as described above, and the relays P2, P4 and P7 effect the connection to the current supply portion of member ST as party line No. 1 is identified. The sequencing relays S1—S4 thereupon sequentially emit current to the coils 24 on the various tiers of cores 16 on panel 12, and the transistors 16A on the cores 16 through which line 18 is threaded "fire" from the combined effects of the energized coils 24 and the e.m.f. in line 18. In the configuration of FIG. 5, voltage would be supplied to relays E2 and E4 which are connected by lines 36 to the two cores 16 through which line 18 is threaded. As all the contacts on relays E2 and E4 are closed, voltage is supplied through leads 66 and 67 through the already closed contacts 130 of relay SA–1. The coils of relays F2 and F4 are then energized and grounded through wire 124 and lamp switch 54 to cause their respective contacts to close, whereupon the lamps 56A and 56B (FIG. 6) will be illuminated. This will denote to the operator that the thousands digit is 6 according to the system previously described.

The sequencing relay 35 (S2) will then function to trigger a monitoring of the second tier of cores 16 (FIG. 3). This tier of cores and the related E series and F series relays are not shown in FIGS. 5 and 6, but would function in identical manner to the E series and F series relays described. Thus, the sequencing relays 35 (S1—S4) would sequentially illuminate two of the five lamps 56 in each row of lamps on the front panel of verifier 44 (FIG. 2) to identify the cores through which wire 18 was threaded on panel 12. The operator would know in advance the assigned number of the line being tested, and if the lamps on verifier 44 did not read back the thousands, hundreds, tens and units digits 6589, he would know that line 18 had been incorrectly threaded through some of the cores 16, and the problem could then be located and rectified.

To conclude the test operation, the starting switch is moved to its off position, and the busy light 50 will go out. THe lamps 56 which have been illuminated in the test will go out when the lamp switch 54 is opened. The line 60 is then removed from the sleeve of the telephone line being tested, and the operation is then completed.

From the foregoing, it is seen that this invention will accomplish its stated objectives, and will provide an easy and economical way to check the proper wiring of the identifier core panels.

We claim:

1. A combination of telephone apparatus for identifying the digital numbers of telephone lines on which direct-dial long distance calls are made; said combination comprising:
- identifier means; and
- verifier means;
- said identifier means comprising a plurality of cores having coils thereon, each of said cores corresponding to different digits; a voltage input circuit connected to said coils; an output circuit; a plurality of relays each corresponding to one of said cores, each of said relays being connected to said output circuit and being adapted to be energized to cause a signal to be conveyed through said output circuit; means adapted to connect said relays to said input voltage circuit in response to energy being induced in said coils; at least one identification wire threaded through certain of said cores which have been preselected to correspond to the digits in the number of a given telephone line, said identification wire being adapted to be connected to said telephone line for receiving current therefrom so as to induce energy in said coils on said preselected cores;
- said verifier means having a plurality of signal means each adapted to be connected electrically to one of said relays, said signal means being energizable in response to actuation of said relays; and means adapted to be connected to said identification wire for imposing a current on said identification wire whereupon said relays corresponding to said preselected cores will be energized, thereby causing certain of said signal means to be energized.

2. The combination of claim 1 wherein said voltage input circuit includes a group of sequencing relays which sequentially supply current to the coils of different groups of cores used to identify different digits of said telephone number, with separate groups of said relays being connected to the coils of each group of cores, and with said signal means being connected to said relays so that said signal means are sequentially energized as input current is sequentially provided to the coils of each group of cores.

3. The combination of claim 1 and a plurality of party line relays, control means for receiving party line identification information, means connecting said control means with various of said party line relays for actuating different ones of said party line relays for different party line identification information, said telephone line being connected to at least one of said party line relays, said party line relays being connected to said voltage input circuit.

4. The combination of claim 2 and a plurality of party line relays, control means for receiving party line identification information, means connecting said control means with various of said party line relays for actuating different ones of said party line relays for different party line identification information, said telephone line being connected to at least one of said party line relays, said party line relays being connected to said voltage input circuit.

5. The combination of claim 1 wherein a starting switch is imposed in said voltage input circuit and is connected to said signal means to selectively connect said verifier means to said identifier means.

6. The combination of claim 5 wherein a busy signal means is connected to said voltage input circuit and said starter switch to become illuminated when said voltage input circuit is operational.

7. The combination of claim 5 wherein a signal switch is connected between said relays and said signal means to selectively control said signal means.

8. The combination of claim 5 wherein said starter switch is connected to a source of electrical energy, a normally open control relay being imposed in said voltage input circuit to control said circuit, means connecting said starter switch and said control relay whereby said control relay is closed when said starter switch is closed.

9. The combination of claim 8 wherein first and second relays are connected to said starter switch and are energized to a closed position when said starter switch is closed, a group of sequencing relays in said voltage input circuit which sequentially supply current to the coils of different groups of cores used to identify different digits of said telephone number, with separate groups of said relays being connected to the coils of each group of cores, and with said signal means being connected to said relays so that said signal means is sequentially energized as input current is sequentially provided to the coils of each group of cores, one of said relays being connected to said sequencing relays and the other of said relays being connected to said signal means whereby electrical energy can pass through said sequencing relays and said signal means.

10. The combination of claim 3 wherein party line selection means on said verifier means is connected to said party line relays and said telephone line for bypassing said control means and for selectively imposing current on said party line relays.

11. The combination of claim 1 wherein said signal means are lamps.

12. The combination of claim 2 wherein said signal means are lamps.

13. The method of verifying the threading of a telephone identification wire through preselected cores of a plurality of cores on a core panel of a telephone identifier means; said telephone identifier means including coils on each of said cores, relays corresponding to each of said cores, and means for actuating each of said relays in response to current being induced in said coil on said core corresponding to said relay; said identification wire being threaded through each of said preselected cores so as to induce a current in said coil on said preselected core when current passes through said identification wire; said method comprising:

connecting an electrical signal indicator to each of said relays, said signal indicators being adapted to be energized in response to energization of said relays; and connecting a current source to said telephone identification wire whereupon current is induced in said coils on said preselected cores, thereby causing energization of said relays corresponding to said preselected cores and causing energization of said indicators connected to said energized relays.